US006259220B1

(12) United States Patent
Hays et al.

(10) Patent No.: US 6,259,220 B1
(45) Date of Patent: Jul. 10, 2001

(54) CONSTANT PRESSURE LIQUID SPRAYING SYSTEM CONTROLLER

(75) Inventors: Lyman V. Hays, Westlake Village, CA (US); Pavel Jekl, Ostrava Poruba (CS)

(73) Assignee: Durotech Co., Moorpark, CA (US)

( * ) Notice: Subject to any disclaimer, the term of this patent is extended or adjusted under 35 U.S.C. 154(b) by 0 days.

(21) Appl. No.: 09/421,777

(22) Filed: Oct. 19, 1999

Related U.S. Application Data

(63) Continuation-in-part of application No. 08/716,030, filed on Sep. 19, 1996, now abandoned.

(51) Int. Cl.[7] ........ H02P 7/00

(52) U.S. Cl. ........ 318/481; 417/44.2

(58) Field of Search ........ 318/645, 481; 417/44.1, 44.2, 41, 45

(56) References Cited

U.S. PATENT DOCUMENTS

| | | | |
|---|---|---|---|
| 3,845,368 | 10/1974 | Elco | 318/139 |
| 3,985,467 | 10/1976 | Lefferson | 417/20 |
| 4,225,290 | 9/1980 | Allington | 417/18 |
| 4,349,868 | 9/1982 | Brown | 364/157 |
| 4,352,636 | 10/1982 | Patterson et al. | 417/22 |
| 4,397,610 | 8/1983 | Krohn | 417/44 |
| 4,677,357 | 6/1987 | Spence et al. | 318/335 |
| 4,917,296 * | 4/1990 | Konieczynski | 239/1 |
| 5,099,183 | 3/1992 | Webe | 318/268 |
| 5,106,268 | 4/1992 | Kawamura et al. | 417/45 |
| 5,197,860 * | 3/1993 | Nishida et al. | 417/34 |
| 5,282,722 | 2/1994 | Beatty | 417/15 |
| 5,360,320 * | 11/1994 | Jameson et al. | 417/4 |
| 5,577,890 * | 11/1996 | Nielsen et al. | 417/44.2 |
| 5,711,483 | 1/1998 | Hays | 239/71 |

OTHER PUBLICATIONS

Paul Horowitz, Winfield Hill, *The Art of Electroncis*, Second Edition, Cambridge University Press, New York, 1991, pp. 143, 421–425, 598 and 1001–1002.

* cited by examiner

*Primary Examiner*—Khanh Dang
*Assistant Examiner*—Rina I. Duda
(74) *Attorney, Agent, or Firm*—Koppel & Jacobs

(57) ABSTRACT

A spray controller accepts a spray pressure input and a pressure control input, and provides a pressure control output. The controller includes an amplifier and pressure transducer, and its pressure control output is the product of the amplifier's gain and the sum of (a) a preset calibration voltage and (b) the product of the pressure transducer's gain and electrical response. The pressure control input controls the gain of the transducer to vary the pressure control output.

21 Claims, 4 Drawing Sheets

CONSTANT PRESSURE LIQUID SPRAYING SYSTEM CONTROLLER

This application is a continuation-in-part of application Ser. No. 08/716,030, filed Sep. 19, 1996, now abandonded, to which priority is claimed under 35 U.S.C. 120.

BACKGROUND OF THE INVENTION

1. Field of the Invention

This invention relates to liquid pumping systems and, more particularly, to constant-pressure liquid spraying systems for use as paint sprayers or similar applications.

2. Description of the Related Art

Spraying systems have supplanted older, labor intensive liquid delivery systems for many applications. The construction industry in particular has seen a significant increase in the use of spraying systems for applying liquid materials to structural surfaces. For example, stucco, drywall "texture" material, insulation/fire retardant materials and paint, which at one time were applied almost exclusively with a trowel, roller, or brush, are now often sprayed onto a target surface. Because painting is probably the most widely-used of these applications, the following discussion will refer to paint spraying, but the problems and solutions apply to all of the above-mentioned applications.

Paint spraying systems typically consist of a reservoir, hoses, pump, pump motor, pump motor controller and "spray gun". The reservoir holds the paint, hoses (or pipes) deliver the paint to the pump and the pump is operated by the motor. Another hose delivers the paint from the pump to the spray gun, where a painter controls the flow of paint by operating a trigger on the gun. Typically, the trigger provides "ON/OFF" control, i.e., when depressed the trigger permits the flow of paint from the hose at a rate which is largely determined by the pressure of the pump and the restriction of the hoses and spray gun orifice (spray tip). When released, the trigger shuts off the flow of paint by closing a valve or "shutter" within the gun.

When operating the paint sprayer, a painter will move along a target surface, e.g. a wall, spraying a portion of the wall with each sweep (horizontal or vertical) of the spray gun. Ideally the pump pressure remains constant as the painter moves along the wall, spraying adjacent sections of the wall with each sweep and applying an even coat of paint to the wall.

However, if the pump pressure does not remain constant, the paint can be applied unevenly. Each painted section preferably has a relatively straight border so that the adjacent section may be painted using a relatively straight motion without creating sections of excessive overlap and/or areas devoid of paint. But, if the pump pressure varies while a section is painted, the spray pattern width will also vary, making it difficult to properly overlap adjacent areas of paint. In addition, pressure variations may produce uneven atomization of the paint, resulting in an uneven thickness of the paint coat. These problems can be very noticeable.

Furthermore, it is desirable to avoid over-spray in any case. Painters typically "mask off" an area that is not to be painted. Precise control of the spraying system's pressure would provide more exact control of the system's spray pattern and may eliminate some of the time consuming masking operation.

Some applications require greater precision than others. Painting the trim on a house, for example, requires greater precision and control than painting a 10 meter by 40 meter warehouse wall. When painting the wall with elastomeric or latex paint, a painter may use the highest pressure setting available on the paint sprayer in order to achieve rapid coverage and a uniform spray pattern. Conversely, when painting the house trim with stain, the painter would set the sprayer at a much lower setting to provide good atomization. At low pressure, when spraying stain for example, pressure variations have a greater impact upon the sprayer's spray pattern. For these reasons, uniformity of pressure is even more important at low pressure settings than at high pressures.

In one approach, a painter sets the pump pressure to a desired level by adjusting a control input such as a dial on the spray system. The system's output pressure is sensed using a resistive strain gauge bridge, and the differential voltage from the bridge is fed to a differential amplifier which provides a signal representative of the system's measured output pressure. This signal is compared with one which represents the desired pressure setting, i.e. the dial setting. The result of this comparison, an error signal, is used to control speed of the pump motor by turning the motor if the pressure is too high, or by increasing the speed if the pressure is too low.

One of the problems with this approach to controlling pressure is that at low pressure levels the pressure sensor is basically using the same scale as at higher pressures; thus system pressure tolerances are approximately the same throughout the sprayer's pressure range. A 344.756 kPa (50 psi) error at a pressure setting of 20.685 MPa (3000 psi) will create the same error signal and same response from the control system as a 344.756 kPa (50 psi) error at a pressure setting of 2.068 MPa (300 psi). This indifference to scale has undesirable consequences in practice. For example, a spray system may provide a pressure range of 2.068 MPa to 20.685 MPa (300 to 3000 psi). If the pump produces 21.030 MPa(3050 psi) instead of a desired 20.685 MPa (3000 psi), the spray pattern out of the spray gun will be slightly wider than desired. If, using the same tolerances, the pump produces 2.413 MPa (350 psi) instead of 2.068 MPa (300 psi), the spray pattern out of the spray gun will be wider by a similar absolute amount.

Although the width of the spray pattern is "off" by the same amount in the preceding example, the resulting pattern error could have more serious consequences in a low-pressure, precision painting application than in a high-pressure application. Additionally, variations in the system's dynamic output pressure (the inevitable fluctuations which occur while pumping) will similarly have more serious consequences at lower pressures.

Another problem with paint sprayers which employ conventional control systems is that they tend to exhibit static pressures which are substantially higher than their dynamic pressures. That is, for a given dial pressure the sprayer's output pressure is much higher when no paint is being sprayed (the trigger is released) than when paint is being sprayed. Thus, the spray pattern is much broader, and there is substantial over-spray when the trigger is initially depressed compared to when the spray pattern has shrunk to the desired size once the control loop stabilizes.

Generally, while liquid is being sprayed the sprayer's output pressure drops until it reaches a "turn on" set point, at which time the system's controller turns the pump motor on. With the pump motor on, the output pressure rises until it reaches a "turn off" set point at which the motor is turned off. Due to a lag in the control system, the pump continues to run for a period of time after the "turn off" threshold is reached. If the sprayer's trigger has been released, the system's output pressure continues to increase substantially because, although the pump continues to operate, there is no flow of paint out of the sprayer. This is the main mechanism for creating the difference between static and dynamic pump pressures.

For the forgoing reasons there is a need for a liquid spraying system which provides a more uniform dynamic pressure, especially at the low pressure range of the spraying system, and which reduces the difference between the system's dynamic and static pressures. There is also a need for a system which achieves these goals using a low complexity feedback-control-loop.

SUMMARY OF THE INVENTION

The invention is directed to a liquid spraying system controller that provides substantially uniform dynamic output pressure with an improved control at low-level pressures. The controller also reduces the difference between dynamic and static output pressures.

A suitable spraying system will include a conventional electric-motor control-circuit, a motor which drives a pump and a spray gun which is connected to the pump and through which the liquid is sprayed. The controller provides a motor control signal for use by a conventional electric motor control-circuit, such as a silicon controlled rectifier (SCR) or other pump motor drive circuit. The controller employs a transducer which provides an electrical response to pressure which is applied to it, e.g. a change in resistance in response to applied pressure. Additionally, the transducer includes a variable electrical supply input which produces a variable gain for the transducer. The transducer provides an output signal which is the product of its electrical response to applied pressure, e.g. change in resistance in the case of a strain gauge bridge, and the gain which is controlled by the variable electrical supply.

The controller also includes an amplifier which amplifies the sum of a preset value (generally negative) and the transducer output (generally positive). In a preferred embodiment, when the sum of the preset value and the product of the transducer's electrical response and its gain is greater than a fixed threshold value, the amplifier's output signals a motor control circuit to turn the system's pump motor off. When the sum of the preset value and the product of the transducer's electrical response and its gain is less than the threshold value, the amplifier output signals the motor control circuit to turn the pump motor on at a speed which varies negatively with the sum of the transducer output and the preset value. The preset value is preferably a factory-set calibration input which corresponds to the maximum system output pressure.

The output pressure of a system which employs the controller is set by adjusting the controller's gain (the transducer gain), which varies inversely with the system's output pressure. By varying the controller's gain in this way, the controller provides more precise control at lower pressures.

The controller also includes a trigger-sense input which, when the spray gun trigger of an associated liquid spraying system is released, overrides the amplifier output, signaling the motor control circuit to turn the system's pump motor off. This action provides more uniformity between static and dynamic pressure for the liquid spraying system.

These and other features, aspects and advantages of the invention will be apparent to those skilled in the art from the following detailed description, taken together with the accompanying drawings.

DETAILED DESCRIPTION OF THE INVENTION

Figure 1:
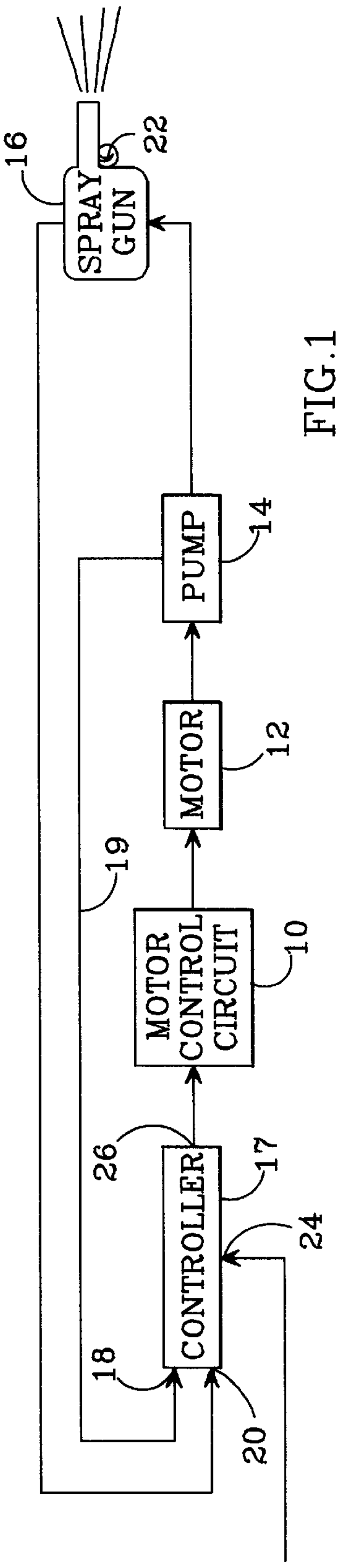
FIG. 1 is a block diagram of a liquid spraying system which employs the inventive controller.

The liquid spraying system of FIG. 1 employs a motor control circuit 10 to drive an electric motor 12 which is mechanically coupled to a pump 14, which in turn delivers pressurized liquid to a spray gun 16, all of which is conventional. A new controller 17 has a pressure input 18 which is connected to receive a mechanical signal from the pump 14. The signal from the pump, which is preferably provided as a fluid under pressure that has been "tapped off" the pump 14 and transmitted through a line 19, is representative of output pressure from the pump 14. The controller 17 also features a trigger sense input 20 which senses the state of the spray gun trigger 22, i.e. whether the trigger is active (depressed) or inactive (released), through the use of a microswitch or other device to be discussed in greater detail with reference to FIG. 3. The controller 17 also has a pressure control input 24 which permits an operator, e.g. a painter, to adjust the system's output or spray pressure. The pressure control input 24 may be a dial setting, a slide switch or similar interface which the painter physically manipulates to indicate the spray pressure he desires.

The controller 17 provides a control signal ($V_{con}$) at the controller output 26 to the motor control circuit 10. $V_{con}$ is responsive to the pressure control 24, trigger sense 20 and pressure 18 inputs. The control signal $V_{con}$ is employed in a conventional manner by the motor control circuit 10 to provide motor drive voltage to the motor 12. For example, the motor control circuit 10 may be an SCR drive circuit or a pulse width modulation (PWM) circuit. In either case, $V_{con}$ is converted into a variable time-duration signal by comparing it with a sawtooth waveform which periodically rises from its minimum value to its peak value ($V_{saw}$). A drive voltage is provided to the motor 12 whenever the sawtooth waveform is greater than $V_{con}$. When $V_{con}$ is at a low level, the motor control circuit 10 provides drive voltage having a high average level; as $V_{con}$ increases, the average drive level decreases until, when $V_{con}$ is greater than or equal to $V_{saw}$, drive voltage to the motor 12 is completely shut off. Output pressure of the pump 14 is a function of the motor's speed which is, in turn, a function of the motor's drive voltage. Thus, by varying the level of $V_{con}$, the controller 17 determines the spraying system's output pressure.

The controller's trigger sense input 20 switches $V_{con}$ to a shut off voltage, which is equal to the sawtooth's peak value $V_{saw}$ whenever the spray gun trigger 22 is released. This action turns the pump motor 12 off immediately when spraying stops. Such positive motor control results in a static pressure only slightly greater than the dynamic system operating pressure. Prior art sprayer systems employ an indirect method of motor turn off which results in a significantly greater difference between the static and dynamic output pressures. Excessive differences between static and dynamic output pressure produce undesirable overspray when spraying first resumes.

Figure 2:
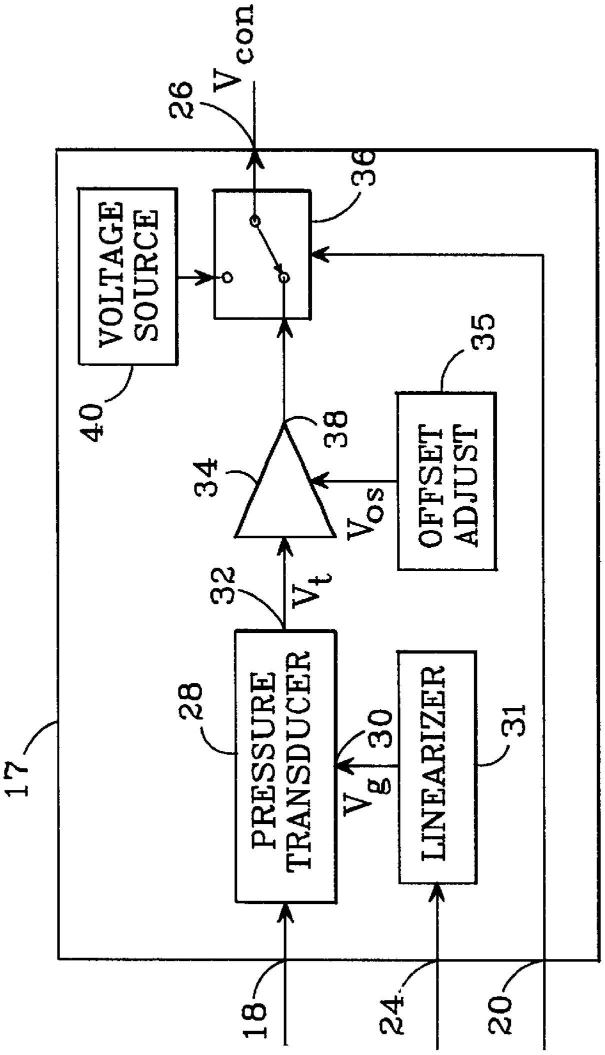
FIG. 2 is a block diagram of the controller which illustrates the basic interconnection and its constituent parts.

The block diagram of FIG. 2 provides a functional-level view of the inventive controller 17. A pressure transducer 28 is mechanically coupled to the output side of the pump 14. This transducer responds to applied output pressure by varying an electrical parameter such as resistance. The transducer 28 features a gain control input 30 to which the system's pressure control input 24 is connected via linearizer 31. The linearizer 31 transforms the pressure control input 24 into a gain control signal ($V_g$). The transducer 28 provides an electrical signal at the transducer output 32 which is equal to the product of the pressure applied to the transducer and the gain of the transducer. Transducer gain has a minimum and a maximum value and is a function of the gain control signal $V_g$. A painter adjusts the spraying system's output pressure by adjusting the gain of the transducer 28 through the pressure control input 24.

The pressure transducer output 32 is connected to the input of amplifier 34 which includes a preset offset voltage ($V_{os}$). In general, the offset is preferably a calibration input which is set in the factory via offset adjustment 35 at the time of system integration. Amplifier 34 amplifies the sum of the variable transducer output voltage ($V_t$) and the preset offset voltage $V_{os}$.

The trigger sense input 20 of the controller 17 controls a switch 36 which connects the amplifier output 38 to the controller output 26 whenever the spray gun trigger 22 is depressed, and connects the controller output 26 to a voltage source 40 which provides a shut off voltage equal to $V_{saw}$ whenever the trigger 22 is released. This use of the trigger to directly turn the motor on and off avoids the undesirable pressure buildups encountered with prior art sprayers.

In the preferred embodiment, the offset voltage $V_{os}$ is a fixed calibration input and the pressure transducer 28 is a strain gauge bridge. This bridge provides a differential output voltage $V_t$ in response to pressure at the pressure input 18. When the pressure impressed upon the transducer 28 is zero, the differential output voltage from the transducer 28 equals zero. The differential output voltage increases in response to increased pressure. Gain of the transducer 28 is proportional to its bias voltage which is equal to the difference of the controller supply voltage ($V_{cc}$) and that at the gain control input $V_g$. As $V_g$ approaches $V_{cc}$, the bias voltage across transducer 28 will decrease causing a corresponding decrease in transducer gain.

During the factory calibration process, the amplifier offset voltage $V_{os}$ is set via offset adjustment 35 so that when the gain control signal $V_g$ is at its maximum value (corresponding to user selection of the maximum output pressure) and the actual pressure applied to the transducer 28 is at the system design maximum when using a spray tip with the largest diameter orifice for which the system is designed, the amplified sum of the output voltage from the transducer 28 and the offset voltage $V_{os}$ is zero volts, i.e. $V_{os}$ is set equal to the negative of the transducer output voltage $V_t$. If the spray gun trigger 22 is then depressed, then $V_{con}$=0 Vdc and the pump motor 12 will operate at maximum speed. This calibration procedure will insure sufficient drive power is available to the pump 14 to force the actual output pressure to equal the maximum system operating pressure when the pressure control input 24 is set for maximum output pressure.

Alternate calibration procedures can be employed to give other useful results. For example, the maximum system operating pressure can be limited to a predetermined safe value by modifying the above procedure such that the offset adjustment 35 is set such that $V_{con}$ equals some fraction of $V_{saw}$ instead of $V_{con}$=0 Vdc.

For a given setting of $V_g$, as the output pressure of the pump decreases, the differential output voltage from the transducer will also decrease. Since the value of $V_{os}$ has been previously fixed during the calibration process, a decreasing transducer output will result in a decreasing controller output $V_{con}$. This event signals the motor control circuit to increase drive voltage to the pump motor which in turn will cause the output pressure to increase. In this manner the controller will tend to counteract output pressure falling below the desired pressure as set by the pressure control input.

In summary, a desired output pressure is set in a novel manner by adjusting the gain of the pressure transducer 28. In this particular embodiment, transducer gain is determined by the bias voltage applied across the transducer. The maximum setting of $V_g$ corresponds to a minimum transducer gain and to the spray system's maximum output pressure. As $V_g$ is decreased, the transducer's gain increases and the differential output voltage from the transducer 28 is likewise increased for a given pressure input 18 level. This increasing transducer gain is manifested in two ways; the $V_{con}$ signal is increased thus setting the output pressure at a lower value, and the response of the controller becomes more sensitive due to increased system gain.

Figure 4B:
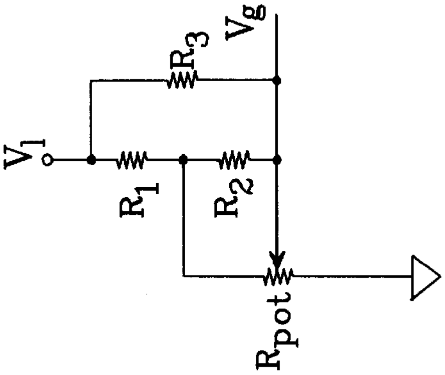
FIG. 4 is a schematic diagram of two versions of "linearizing" resistor network for use with the invention's pressure selection input.
Figure 3:
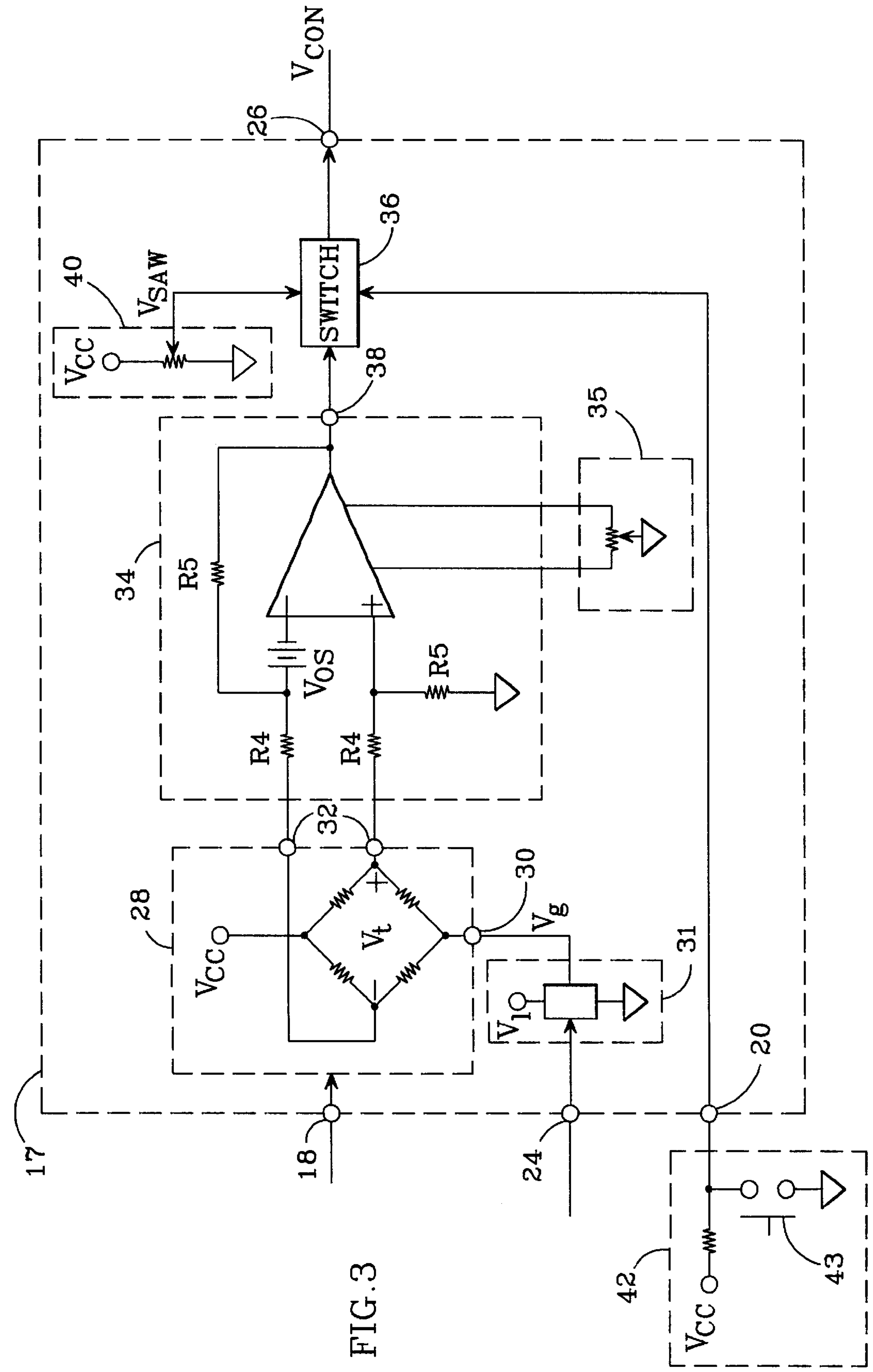
FIG. 3 is a schematic diagram of one embodiment of the controller.

The schematic of FIG. 3 illustrates a preferred embodiment of the controller 17 wherein the gain control voltage $V_g$ is supplied by a variable resistor network which will be discussed in detail in connection with FIG. 4. Transducer 28 provides a differential output voltage $V_t$ in response to pressure applied to the transducer through the pressure input 18 and in response to the gain control signal applied to gain control input 30. The differential voltage $V_t$ is supplied to the input of differential amplifier 34. Amplifier 34, as previously discussed, produces an output voltage equal to the amplified value of the sum of the transducer's variable output voltage $V_t$ and the preset offset voltage $V_{os}$. In the preferred embodiment, an LM741 differential amplifier is used. This particular amplifier has a null input which is provided to eliminate undesired DC offset. However, in this embodiment, the null input is used to deliberately insert a fixed amount of offset $V_{os}$. Strain gauge bridges and differential amplifiers are known in the art; for a discussion of them see Paul Horowitz, Winfield Hill, *The Art of Electronics,* Second Edition, Cambridge University Press, New York, 1991 at pages 1001–1002 and 421–425 respectively.

Switch 36 is implemented as an analog multiplexer which is controlled by trigger sense input 20. This multiplexer serves to route either the amplifier output 38 or a voltage equal to a shut off voltage $V_{saw}$, supplied by voltage source 40 which is in this case implemented as a resistor divider, to the controller output 26. A conventional trigger sense circuit 42 detects activation of the trigger 22, which in turn causes the switch 36 to connect the amplifier output 38 to the controller output 26. Conversely, when the trigger sense circuit 42 detects release of the trigger 22, it connects the "shut off" signal $V_{saw}$ through the multiplexer to the controller output 26. In the preferred embodiment, the trigger sense circuit 42 is a mechanical switch 43 connected to a pull-up resistor to provide a logic "LOW" to the multiplexer whenever the trigger 22 is depressed and a logic "HIGH" whenever the trigger 22 is released. The trigger sense circuit 42 could, in fact, employ any of a number of techniques such as opto-reflective, opto-interruptive, Hall-effect, in combination with optical, electrical, radio or infrared transmission to produce and transmit a signal to the controller trigger sense input 20 which is coincident with activation of the trigger 22. For a discussion of analog multiplexers and opto-interrupters and reflectors see Paul Horowitz, Winfield Hill, *The Art of Electronics,* Second Edition, Cambridge University Press, New York, 1991 at pages 14 and 598, respectively.

Performance of the circuit can be described mathematically. In the following analysis, laminar flow is assumed at the spray gun aperture. This assumption permits derivation of relatively simple mathematical expressions which facilitate quantitative discussion of the variable gain concept.

Figure 4A:
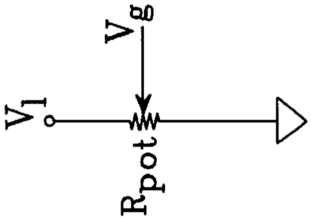

Initially assume that linearizer 31 is a simple potentiometer (pot) connected between $V_l$ and ground as illustrated in FIG. 4A. Further assume clockwise rotation of the pot is intended to increase system operating pressure. With these assumptions, the pressure transducer bias voltage $V_b$ is given by:

$$V_b = V_{cc} - V_g = V_{cc} - V_l\frac{P_d}{P_{\max}}$$

where:

$V_b$=transducer bias voltage $V_{cc}$=controller positive supply voltage $V_g$=gain control signal $V_l$=linearizer supply voltage $P_d$=desired pressure set by the linearizer pot Pmax=maximum system operating pressure The differential output voltage of the pressure transducer output 32 is given by:

$$V_t=K_tV_bP_{out}$$

where:

$V_t$=transducer output voltage $K_t$=transducer sensitivity $P_{out}$=system output pressure, i.e. pressure imposed upon the transducer via pressure input 18

The differential amplifier output 38 VI is given by:

$$V_{con}=K_a(V_t+V_{os})=K_tK_a(V_{cc}-V_l(P_d/P_{max}))P_{out}+V_{os}K_a$$

and $$K_a = \frac{R5}{R4+R_t}$$

where:

$V_{con}$=control signal at controller output 26

$V_{os}$=preset offset voltage $K_a$=effective gain of amplifier 34

$R_t$=equivalent resistance of transducer bridge 28

R4=input resistance

R5=feedback resistance

Note that the desired pressure $P_d$ and the actual output pressure $P_{out}$ are multiplied. In a classical proportional control system they are subtracted from each other in order to form an error voltage that is used to control the output process. This multiplication yields new and useful results such as improved pressure control performance at low system operating pressure.

To further simplify this analysis, the motor control circuit 10 is assumed to use PWM. Similar results are obtained assuming an SCR implementation but computations are more complex due to the non-linear relationship between $V_{con}$ and the drive voltage applied to the motor 12. Assuming PWM, speed of pump 14 will increase linearly as $V_{con}$ is decreased from $V_{saw}$ to $_0$ Vdc. Thus maximum flow rate ($F_{max}$) will occur when $V_{cc}$=0. Output flow rate is given by:

$$F=F_{max}(1-(V_{con}/V_{saw}))$$

where:

F=system output flow rate $F_{max}$=system maximum output flow rate $V_{saw}$=peak value of the motor control circuit 10 sawtooth signal, i.e. the signal to which the controller output voltage $V_{con}$ is compared The output pressure of a liquid delivery system is a function of flow restriction R and flow rate F:

$$P_{out}=RF$$

where:

R=flow restriction

The linear relationship between $P_{out}$ and F results because laminar flow has been assumed. For turbulent flow, substitute $P_{out}=RF^2$.

During the calibration process, $V_{os}$ is set such that when $P_d=P_{max}$, $P_{out}=P_{max}$ and $R=R_{min}$ then $V_{con}=0$. Using the above relationships, the offset voltage $V_{os}$, which is set in the factory during system integration and calibration, is given by:

$$V_{os} = \frac{R_{\min}F_{\max} - P_{\max}}{R_{\min}F_{\max}K_a}V_{saw} \quad \text{assuming } V_{cc} = V_l$$

$$\text{where: } R_{\min} = \frac{P_{\max}}{F_{\max}}$$

The system output pressure is then given by:

$$P_{out} = \frac{P_{\max}}{1 + \frac{RF_{\max}}{V_{saw}}K_tK_a\left(V_{cc} - V_{cc}\frac{P_d}{P_{\max}}\right)}\frac{R}{R_{\min}}$$

Figure 5:
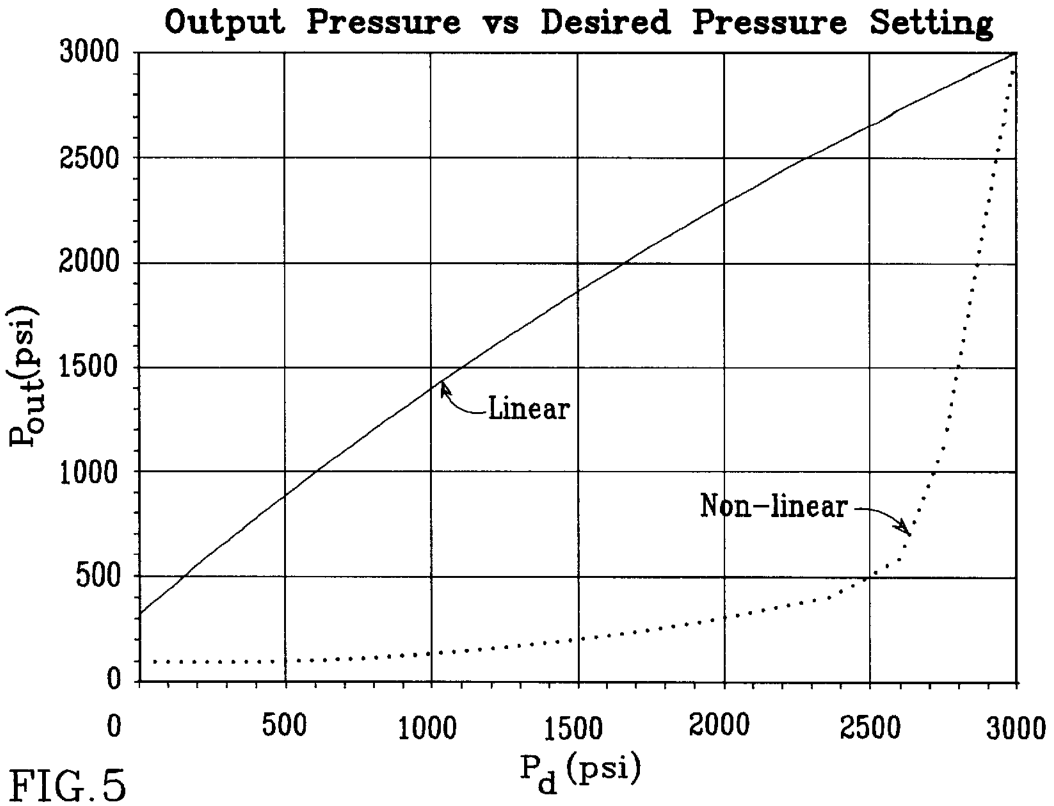
FIG. 5 is a plot of the liquid spraying system's output pressure versus desired pressure settings.

This expression for system output pressure $P_{out}$ is plotted as a function of desired pressure $P_d$ (dotted line in FIG. 5) by substitution of the following values:

$V_{cc}$=5 Vdc $P_{max}$=3000 psi $K_t=7.33\times10^{-6}$ psi$^{-1}$ $K_a$=1000 V/V $V_{saw}$=4 Vdc $F_{max}$=0.4 gpm $R_{min}$=7500 psi min gal$^{-1}$ Specific values of $P_d$ are selected by rotation of the pressure control pot $R_{pot}$ illustrated in FIG. 4A. It is apparent that, although the controller as described to this point provides effective output pressure control through the adjustment of the transducer bias supply voltage, the results are very non-linear. That is, linear movement of the pot wiper does not result in a corresponding linear change in the output pressure. This situation can be improved by modifying the linearizer 31 per FIG. 4B by the addition of three resistors R1, R2 and R3.

The following set of equations can be derived using the procedure previously outlined. The expression for transducer bias voltage is now more complex due to the addition of the linearizer resistors.

$$V_g=V_{cc}R_{pot}(P_d/P_{max})/\{[R3(R1+R_p)/(R3+R_p)]+R_{pot}(P_d/P_{max})\}$$

where:

$R_p=[R2R_{pot}(1-P_d/P_{max})]/[R2+R_{pot}(1-P_d/P_{max})]$ $V_{os}=(V_{saw}/R_{min}F_{max}K_a)[R_{min}F_{max}(1-(K_tK_aV_{tmax}P_{max}/V_{saw}))-P_{max}]$ $V_{tmax}=V_{cc}-V_g$ given $P_d=P_{max}$ $V_{con}=K_tK_a(V_{cc}-V_g)P_{out}+V_{os}K_a$ $P_{out}=RF_{max}(1-V_{os}K_a/V_{saw})/[1+(RF_{max}/V_{saw})K_tK_a(V_{cc}-V_g)]$ This new expression for system output pressure $P_{out}$ is plotted as a function of desired pressure $P_d$ (solid line in FIG. 5) by substitution of the following values:

R1=1870 ohms

R2=100 ohms

R3=1500 ohms $R_{pot}$=10,000 ohms

Use of this simple linearizer circuit is thus shown to substantially improve system linearity.

Figure 6:
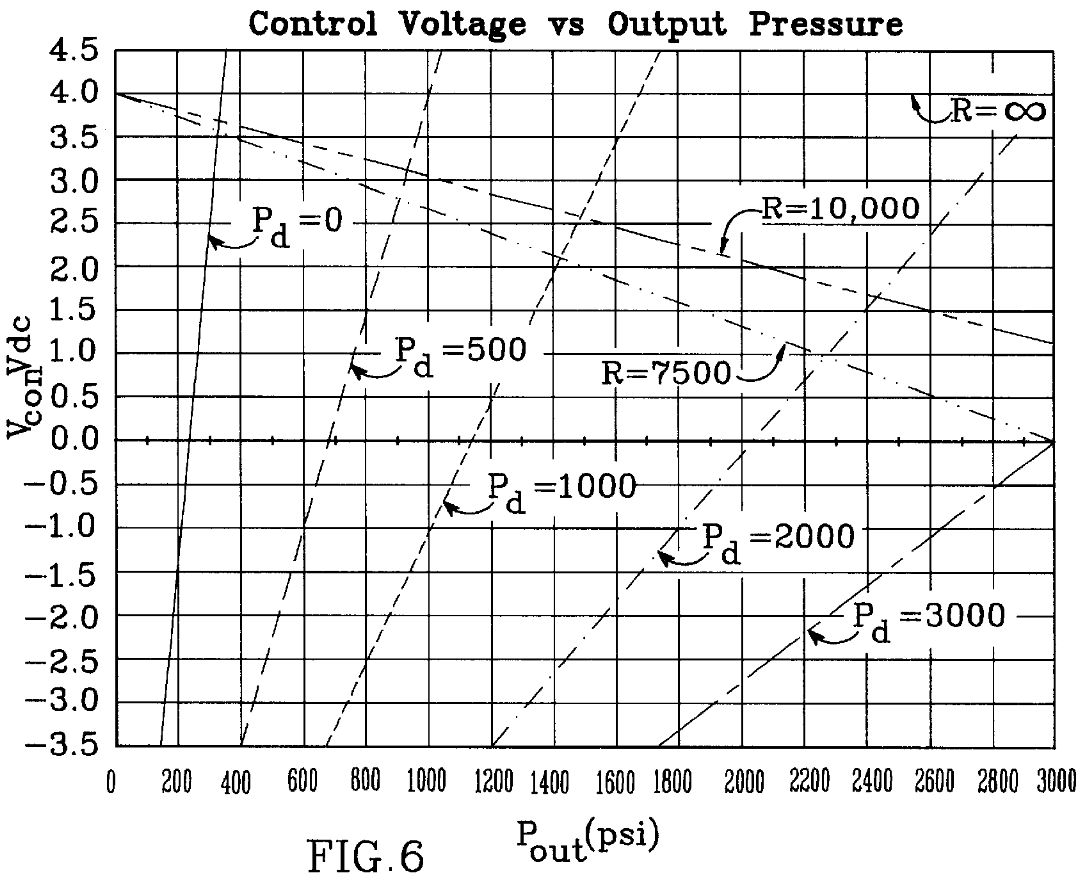
FIG. 6 is a plot of the control voltage verses a family of desired pressure settings with three load lines for the controller of FIG. 3 with the linearizer of FIG. 4B.

It is instructive to examine how the control signal $V_{con}$ is influenced by various system parameters. In FIG. 6 $V_{con}$ is plotted verses the system output pressure $P_{out}$ for a family of five different values of the desired pressure $P_d$. These lines are referred to as "operating lines". Three "load lines" are also included. Each load line represents a different value of flow restriction R. The R values correspond to different diameters of the spray gun outlet orifice.

The previously described calibration process for preset offset voltage $V_{os}$ forces the $P_d$=3000 operating line to intersect the (3000, 0) point. Thus when the pressure control input 24 pot is set to 3000 psi, the system output 15 pressure will also be 3000 psi given R=7500. This particular value of R represents the maximum design load for this spray system, e.g. maximum flow of 0.4 gpm is delivered at maximum pressure 3000 psi.

The R=∞load line represents the condition when the fluid flow is blocked, i.e. F=0. This condition corresponds to the minimum system load and can be viewed as an orifice size of zero. $V_{con}$ equals $V_{saw}$, and the pump is idle.

The R=10,000 load line is included to illustrate system response to load variation, in this case a load decrease of about a third. If for example, the pressure control pot is set for 13.79 MPa (2000 psi), then $P_{out}$ will increase from 15.66 to 16.66 MPa (2271 to 2417 psi) for a 1.00 MPa (146 psi) difference as the flow restriction is increased from 7,500 to 10,000. If instead the pressure control pot is set for 3.45 MPa (500 psi), then $P_{out}$ will increase from 6.25 to 6.41 MPa (907 to 930 psi) for a difference of only 0.16 MPa (23 psi). Thus it is evident that improved pressure control is achieved at low output pressures. Such improvement is due to the increased slope (gain) of the operating lines as $P_d$ decreases.

Figure 7:
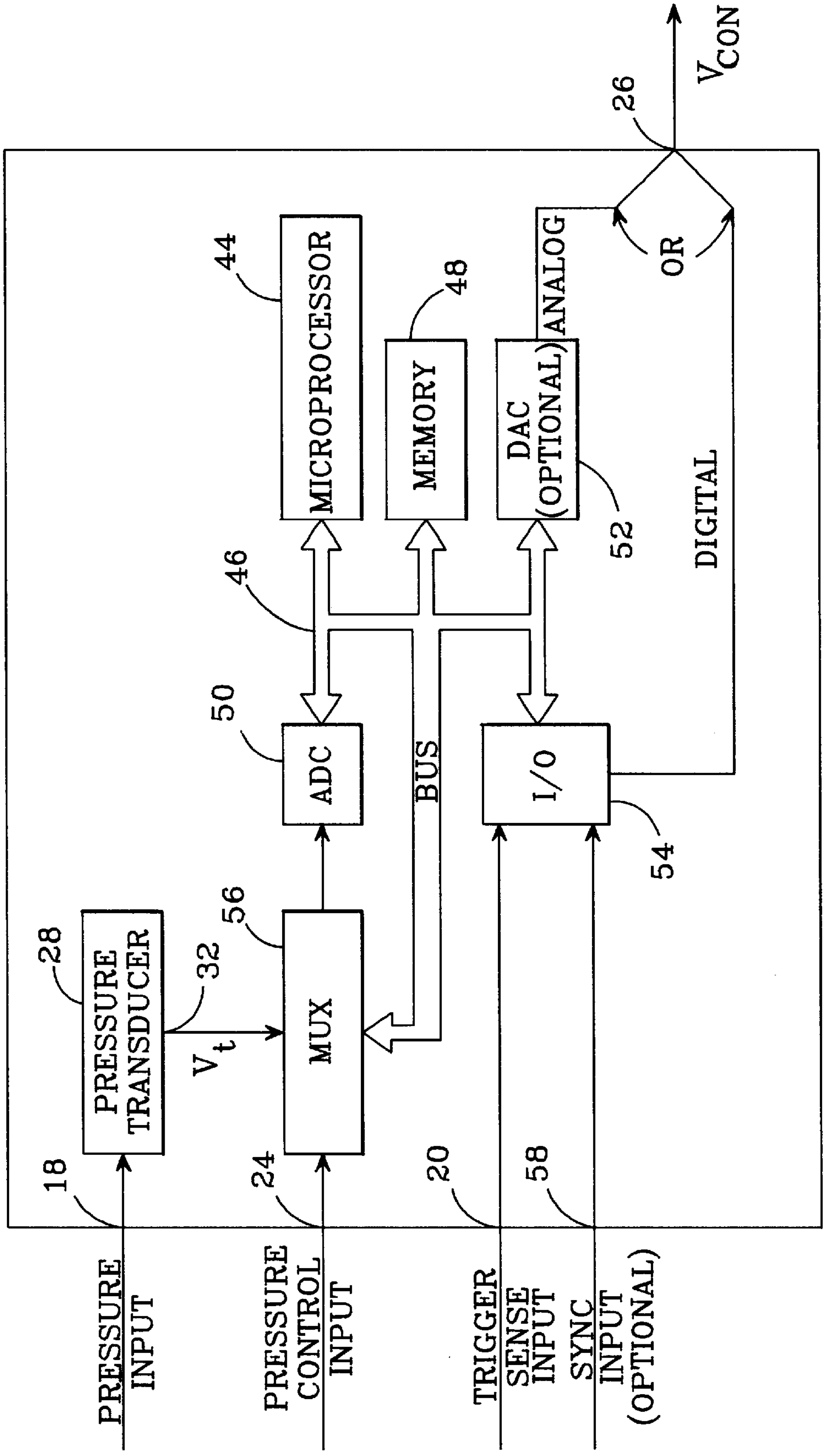
FIG. 7 is a block diagram of a microprocessor-based implementation of the inventive controller.

An alternative implementation of the controller 17 is illustrated in the block diagram FIG. 7. In this implementation, the controller 17 includes a microprocessor 44 which communicates through a bus 46 with a memory 48 from which it obtains instructions and data and in which it stores data such as actual pressure readings, desired pressure settings and preset values. The microprocessor 44 also communicates with an analog to digital converter (ADC) 50, an optional digital to analog converter (DAC) 52, an input/output block (I/O) 54 over the bus 46 and a multiplexer (MUX) 56.

The pressure control input 24 provides an analog signal corresponding to the desired pressure as set by the operator. The pressure transducer 28 generates at its output 32 a signal corresponding to the pressure input 18. The MUX 56 routes these signals to the ADC 50 under control of the microprocessor 44. The microprocessor 44 reads their values through the ADC 50 and produces a corresponding output voltage $V_{os}$ which may be either an analog or binary signal depending upon the type of motor control circuit 10 employed.

If the motor control circuit 10 requires $V_{con}$ in an analog form, then the optional DAC 52 is used to provide the conversion. The motor control circuit 10 could for example utilize $V_{con}$ in the same manner as set forth above, i.e. comparing $V_{con}$ to $V_{saw}$ to determine the pump motor 12 drive voltage.

In some implementations, it is simpler to provide $V_{con}$ as a binary string of "LOWS" and "HIGHS" which collectively form a train of variable width pulses. Use of a binary form is advantageous in that $V_{con}$ need not be compared with $V_{saw}$ but can instead be directly applied to SCR or PWM motor control circuits to produce the desired motor drive 5 voltage. An optional line sync input 58 is provided to permit the $V_{con}$ pulses to be synchronized to an external timing source such as the AC power line voltage. Such synchronism is particularly useful when triggering SCRS. For example, the line sync input 58 would momentarily pulse to indicate the AC voltage zero crossing.

In this implementation, both trigger sense input 20 and line sync input 58 are non-maskable interrupts which alert the microprocessor 44 via the I/O block 54 as soon as their status changes, allowing the microprocessor 44 to immediately react with appropriate modification of $V_{con}$.

All of the functions illustrated in FIG. 2 and in some cases portions of the motor control circuit 10 in FIG. 1 can be implemented using a single microprocessor. For example, the variable-gain pressure transducer 28 can be realized simply by reading the signal at the transducer voltage 32 via the ADC 50 and then multiplying it internally by the appropriate gain factor as determined by the pressure control input 24. Linearization can be accomplished simply by reference to a look-up table stored in the memory 48.

The forgoing description of specific embodiments of the invention has been presented for the purposes of illustration and description. It is not intended to be exhaustive or to limit the invention to the precise forms disclosed, and many modifications and variations are possible in light of the above teachings.

For example, the spraying system may spray stucco or drywall texture material rather than paint. In fact the technique illustrated need not be limited to spraying systems, but can be applied equally well to liquid delivery systems in general where pressure control is needed. The controller may comprise a single-chip microcontroller with on-chip analog-to-digital and digital-to-analog converters operated in combination with a resistor bridge transducer. The pressure transducer may be a metal foil resistor bridge, a semiconductor resistor bridge or any other type of pressure transducer which responds electrically to a pressure imposed upon it. The transducer supply may be a current source and the amplifier may be an instrumentation amplifier. Furthermore, the gain which controls output pressure may be varied by means other than varying the transducer's supply voltage. For example, the transducer can include a fixed gain pressure transducer element followed by a variable gain element. This variable gain element could, for instance, be implemented by a variable gain amplifier or simply by a potentiometer directly controlled by the pressure control input 24. The motor control circuit 10 and motor 12 need not relate to electric motors but could instead relate to internal combustion engines.

The embodiments were chosen and described in order to best explain the principles of the invention and its practical application, to thereby enable others skilled in the art to best utilize the invention. It is intended that the scope of the invention be limited only by the claims appended hereto.

We claim:

1. A pressure controller for a pumping system, comprising:

a transducer connected to receive a physical indication of pressure in a fluid being pumped, said transducer converting said physical indication into an electrical response;

a transducer interface circuit connected to said transducer for sensing said electrical response, said transducer interface circuit having a variable gain responsive to a gain control circuit and producing a transducer interface output which is the multiplicative product of said electrical response and said variable gain, said output providing a pump control signal for the pumping system;

a pressure control circuit which provides a pressure control signal representative of the desired pressure at which the pumping system's pressure is to be controlled;

wherein said pressure control signal is coupled to said gain control circuit to control the variable gain of said transducer interface circuit, thereby varying said gain to bring the fluid's pressure to the desired pressure.

2. The controller of claim 1, wherein said transducer interface circuit comprises an amplifier connected to amplify the sum of said electrical response and a fixed preset voltage, and wherein said fixed preset voltage is independent of said pressure control signal.

3. The controller of claim 1, wherein a manually operated pressure control input is connected to control said pressure control circuit.

4. The controller of claim 3, wherein said pressure control circuit comprises a linearizing circuit connected to compensate for nonlinearities in a response of said pressure control circuit to said pressure control input.

5. The controller of claim 1, wherein the variable gain of said transducer interface circuit is dependent upon a voltage applied across said transducer, and said gain control circuit comprises a biasing circuit responsive to said pressure control signal for varying said variable gain.

6. The controller of claim 5, wherein said transducer interface circuit comprises a strain-gauge bridge network, arranged to sense said electrical response of said transducer.

7. The controller of claim 2, wherein said controller further comprises a two-state trigger sense input and a pressure control output, said trigger sense input configured to force said pressure control output to a shut off condition in response to one state of said trigger sense input and to have no effect on said pressure control output in response to the other state of said trigger sense input.

8. The controller of claim 7, wherein said trigger sense input is connected to control the interconnection, through a switch, of said pressure control output, said transducer interface output and a shut off input, said trigger sense input causing the connection of the shut off input to said pressure control output in response to one state of said trigger sense input, and causing the connection of said transducer interface output to said pressure control output in response to the other state of said trigger sense input.

9. A pumping system, comprising:

a pump for pumping liquids, an electric motor mechanically linked to drive said pump, a motor control circuit having an output connected to provide a controlling signal to said motor, said circuit responding to a motor control input signal by varying said controlling signal in inverse relation to said motor control input signal, said circuit further recognizing a shut off voltage at said input at which voltage said control circuit terminates said controlling signal, and a controller having a transducer connected to receive a physical indication of pressure in a fluid being pumped, said transducer converting said physical indication into an electrical response, said transducer further having a variable electrical supply input, said supply input responsive to a manual pressure control input and producing a variable voltage across the transducer in response to said manual input, said transducer further producing an electrical output signal which is a multiplicative product of said electrical response and said voltage across the transducer, and an amplifier having signal inputs connected to amplify the sum of said electrical output signal and a fixed preset voltage, said amplifier having an output which provides said motor control signal.

10. The pumping system of claim 9, further comprising a spray gun connected to receive liquid from said pump and to spray said liquid, said spray gun also having a trigger which, when activated, initiates spraying of said liquid under pressure produced by said pump.

11. The pumping system of claim 10, wherein said controller further comprises a two-state trigger sense input, said trigger sense input connected to control the interconnection, through a switch, of said motor control signal, said amplifier output and a shut off input, said trigger sense input causing the connection of the shut off input to said motor control signal in response to one state of said trigger sense input and causing the connection of said amplifier output to said motor control signal in response to the other state of said trigger sense input.

12. The pumping system of claim 11, wherein said controller further comprises a trigger sense circuit connected to detect the position of said trigger and to transmit said position information to said trigger sense input.

13. The pumping system of claim 9, further comprising a linearizing circuit connected to receive power from a voltage source, to provide a variable electrical supply to said transducer's variable electrical supply input and to vary said supply in response to said manual pressure control input.

14. A liquid spraying system, comprising:

a pump for pumping liquids, an electric motor mechanically linked to drive said pump, a spray gun connected to receive liquids from said pump, and a variable gain controller for the pump motor having an input representing a user-selectable desired spray pressure, the controller gain varying in negative relation to the magnitude of a selected spray pressure;

wherein said variable gain controller is connected so that the desired spray pressure is selected by varying only the controller gain.

15. The liquid spraying system of claim 14, wherein said variable gain controller comprises a variable gain amplifier.

16. A closed loop feedback method of controlling a process, comprising:

A) sensing an output parameter of the process to be controlled and producing a sensing signal responsive to said sensing, B) amplifying the sensing signal by a variable gain, C) summing the amplified sensing signal with a predetermined offset signal, D) amplifying the amplified sensing signal to produce a control signal for controlling said process, and E) establishing a desired level for said output parameter by adjusting the variable gain of step B) while holding constant the predetermined offset signal of step C.

17. A pressure controller for a pumping system, comprising:

a transducer connected to receive a physical indication of pressure in a fluid being pumped, said transducer converting said physical indication into an electrical response;

a transducer interface circuit connected to said transducer for sensing said electrical response, said transducer interface circuit having a variable gain responsive to a gain control input and producing a transducer interface output which is the product of said electrical response and said variable gain;

an amplifier connected to amplify said transducer interface output, the output of said amplifier providing a pump control signal; and a pressure control circuit which provides a pressure control signal representative of the desired pressure at which the pumping system's pressure is to be controlled;

wherein said pressure control signal is coupled to said gain control input to control the variable gain of said transducer interface circuit, thereby varying said gain to bring the fluid's pressure to the desired pressure; and wherein said amplifier does not subtractively compare said transducer interface output with said pressure control signal, so that the output of said amplifier is not proportional to the difference between the transducer output and said pressure control signal.

18. The pumping system of claim 9, wherein said amplifier does not subtractively compare said electrical output signal with said manual pressure control input, so that the output of said amplifier is not proportional to the difference between the transducer output and said pressure control signal.

19. The method of claim 16, wherein said process is a pumping system and said output parameter is pressure, and further comprising the step of controlling a pump with said control signal.

20. The controller of claim 2, wherein said fixed preset voltage is substantially equal to the product of (a) a predetermined controller output shut off voltage above which the controller produces a pumping system shut off signal divided by the gain of said amplifier and (b) one minus the quantity of a predetermined maximum pressure of said fluid divided by the pressure of said fluid when said variable gain is at a minimum and said pumping system is subjected to a predetermined maximum design load, whereby said pumping system's pressure is limited to said predetermined maximum pressure.

21. The controller of claim 9, wherein said fixed preset voltage is substantially equal to the product of (a) a predetermined controller output shut off voltage above which the controller produces a pumping system shut off signal divided by the gain of said amplifier and (b) one minus the quantity of a predetermined maximum pressure of said fluid divided by the pressure of said fluid when said variable gain is at a minimum and said pumping system is subjected to a predetermined maximum design load, whereby said pumping system's pressure is limited to said predetermined maximum pressure.

* * * * *